Dec. 19, 1944. H. L. LAMBERT 2,365,642
VARIABLE CIRCUIT CONTROLLER
Filed June 26, 1943 2 Sheets-Sheet 2

INVENTOR
Harry L. Lambert
BY
Parker Prochnow & Farms
ATTORNEYS

Patented Dec. 19, 1944

2,365,642

UNITED STATES PATENT OFFICE 2,365,642

VARIABLE CIRCUIT CONTROLLER

Harry L. Lambert, Enfield, N. Y., assignor, by mesne assignments, to Walter J. Pickering, New York, N. Y.

Application June 26, 1943, Serial No. 492,396

14 Claims. (Cl. 200—80)

This invention relates to circuit controllers, and more particularly to those which are responsive to centrifugal forces for their operation.

One object of the invention is to improve circuit controllers of this type, and to provide a controller which may be adjusted to vary the speed at which it becomes effective.

Another object of this invention is to provide an improved circuit controller which will open or close a circuit when a selected speed of rotation of an object is obtained; with which the speed at which the circuit controller is effective may be varied within considerable limits in a simple manner, and even while the controller is in motion; which will be particularly sensitive and accurate, compact, simple and inexpensive in construction; and which will have long life.

Another object of the invention is to provide an improved circuit controller which will automatically control an electric circuit in response to centrifugal forces; which will provide the advantages of a mercury tube switch with the resultant long life and freedom from service; and with which the speed at which the device becomes effective may be varied in a simple manner while the device is idle or in operation.

Other objects and advantages will be apparent from the following description of an embodiment of the invention, and the novel features will be particularly pointed out hereinafter in connection with the appended claims.

Figure 1:
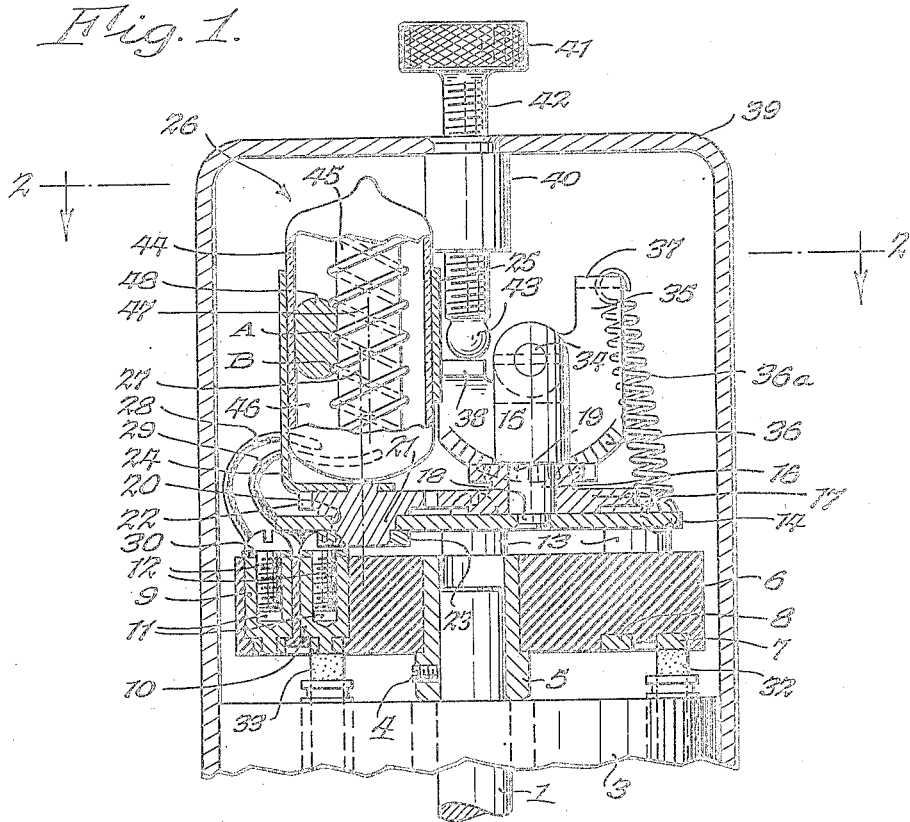
Fig. 1 is a sectional elevation through a controller constructed in accordance with this invention, the section being taken approximately along the line 1—1 of Fig. 2.
Figure 2:
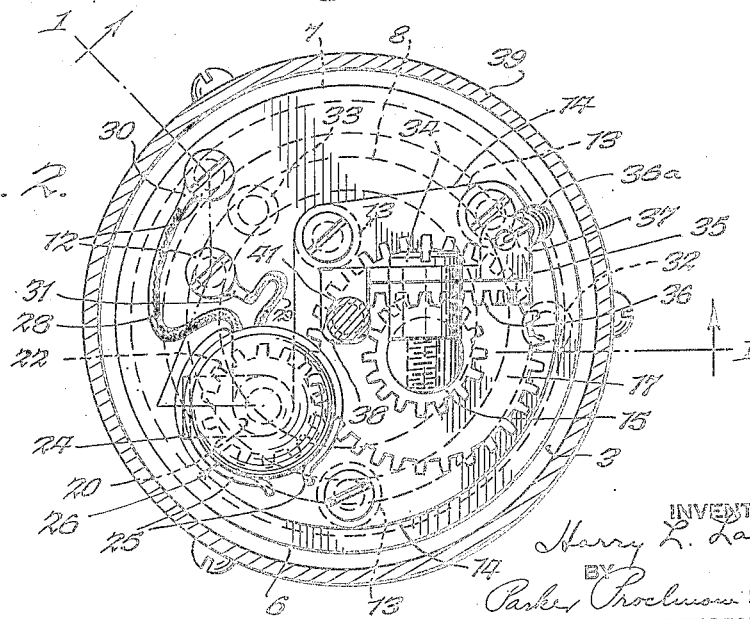
Fig. 2 is a sectional plan of the same, the section being taken approximately along the line 2—2 of Fig. 1.
Figure 3:
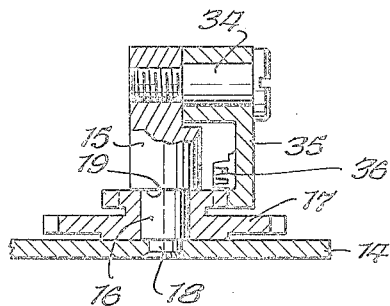
Fig. 3 is a sectional elevation through a portion of the controller to show certain details of construction.
Figure 4:
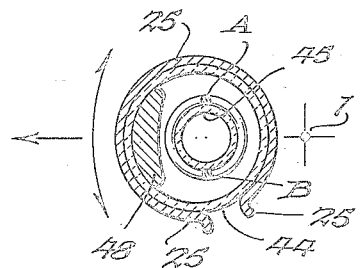
Fig. 4 is a sectional plan through the mercury tube switch and its mounting used in this controller.

In the embodiment of the invention illustrated in Figs. 1-4, the source of operating power for the controller is the shaft 1, which is mounted for rotation in any suitable manner. This shaft 1 may be, for example, the armature shaft of a motor 2, in Fig. 5, or it may be a separate shaft which is driven at any given speed ratio from the armature shaft of a motor, or it may be driven from any other suitable source of power. Surrounding the shaft 1 is a base 3 which is relatively stationary. Removably secured upon the end of the shaft 1, such as by a set screw 4, is a sleeve 5 which may be of metal. Mounted upon the sleeve 5 is an element 6 of suitable insulating material which may, if desired, be molded directly upon the periphery of the sleeve 5, but spaced from that end of the sleeve 5 which first passes over the end of the shaft 1, so that the element 6 will be spaced from the adjacent face of the base 3.

The element 6 rotates with the shaft 1 and upon its face towards the base 3, it carries collector rings 7 and 8 which are concentric with the shaft 1, spaced from one another and countersunk into the face of the element 6 to some extent. The rings 7 and 8 may be secured to the element 6 in any suitable manner, and by suitable connecting means, such as by studs 9 and 10 which have reduced ends extending through apertures in the rings 7 and 8, with the free ends of the reduced portions upset in countersunk recesses in the outer faces of the rings. These studs 9 and 10 are provided with roughened peripheries and may be molded in the insulating material of the element 6. The other ends of the studs 9 and 10 are provided with threaded recesses 11 which receive screws 12 that serve as connector terminals.

Mounted upon that face of the element 6 which is opposite the face carrying the rings 7 and 8, are spacer studs 13 which, at their outer ends, mount a metal plate 14 in spaced relation to the adjacent face of the element 6. A bearing post 15 (Fig. 3) is provided on plate 14 with a reduced bearing portion 16 rotatably mounting a double gear 17, and the reduced end of the post beyond the bearing portion 17 is further reduced, as at 18, which portion passes through an aperture in the plate 14. Its end passing through the plate 14 is upset so as to rivet the post to the plate 14. The plate 14 and a shoulder 19 on post 15 confine the gear 17 thereon. The plate 14 is also provided with an aperture 20 (Fig. 1) offset from the shaft 1, which rotatably supports a bearing portion 21 of a pinion or gear 22 which meshes with one part of the double gear 17. The bearing portion 21 extends beyond the lower face of the plate 14 and is there reduced in diameter.

Over this reduced portion, a ring 23 is placed to overrun the underface of the plate 14, and the projecting part of the reduced bearing portion 21 is upset so as to rivet the ring 23 thereon. This ring 23 serves to confine the gear 22 rotatably to the plate 14. The gear 22 thus rotates about its own axis 27, which is parallel to but offset from the axis of rotation of the shaft 1. Secured upon the upper face of the gear 22 is an arm 24 which extends first laterally from the axis of this gear and then in a direction parallel to the axis of the shaft 1. At its free end this arm 24 is provided with two spaced spring arms 25 which are bowed away from one another to form between them a socket for receiving a switch device 26. This switch device is thus removably clamped to the arm 24 which is fixed to the gear 22, with its axis approximately coincident with the extended axis of rotation of the gear 22.

Conductors 28 and 29 lead from the switch device 26 and have flat plate-like terminals 30 and 31 through which the screws 12 extend. Abutment of the terminals against the face of the element 6 prevents withdrawal of studs 9 and 10. These conductors 28 and 29 are of freely flexible wire with sufficient slack to enable rotation of the switch device 26 through, at least, a half revolution of the gear 22, and through these conductors the switch device is continuously connected to the rings 7 and 8 on the insulating element 6. Brushes 32 and 32 are carried by the base 3, yieldingly projected outwardly, and bear respectively against the faces of the rings 7 and 8 so as to establish continuous electrical contact with those rings even while the element 6 is rotating with the shaft 1.

Mounted in a notch upon a side face of the post 15 (Fig. 3) at its upper or outer end, and by a pivot screw 34, is a lever 35 which has rack teeth 36 on a marginal portion thereof which mesh with teeth of the double gear 17. A helical spring 36a (Figs. 1 and 2) is connected between the plate 14 and a lug or ear 37 on the lever 35, so as to yieldingly and continually urge the lever 35 in one direction of rotation. The pivot screw 34 of the lever 35 is crosswise of, and at one side of, the extended axis of the shaft 1, and the lever 35 has a laterally extending lug or abutment 38 that extends across and normal to the extended axis of the shaft 1. In other words, the abutment 38 is in endwise alinement with the shaft 1, with a face thereof normal to the axis of the shaft 1. Telescoping over the base 3 is a tubular shell 39 which extends beyond the element 6 and parts mounted thereon and forms a protecting housing therefor. Secured to the end wall of the housing 39 and in endwise alinement with the shaft 1, is a sleeve 40 with a threaded, endwise passage, and a control member 41 having a threaded shank 42 is threaded through the passage of sleeve 40 into the chamber within the housing 30.

This threaded shank 42 of the control member terminates in a convex end or generally ball-like head 43, which head bears against a face of the abutment 38 at a point which preferably is in substantial alinement with the extended axis of the shaft 1. This head 43 acts as a stop to limit rocking movement of the lever 35 under the action of the spring 36 and, thus, by turning the control member 41 in one direction, it will rock the lever 35 in one direction, and when turned in the other direction, the spring 36 will rock the lever 35 to follow the ball head 43. The rocking of the lever 35 imparts increments of rotary movement to the double gear 17 and the latter, through its meshing engagement with the gear 22, also imparts increments of rotary movement to the latter and hence to the circuit device 26 about the axis 27 for a purpose which will be explained shortly.

The switch device 26 is one which becomes effective to open or close a circuit in response to centrifugal forces when any selected speed of rotation is reached, and in my copending application Serial No. 492,395, filed June 26, 1943, I have disclosed a number of mercury tube switches which have this property and any of which may be employed as the switch device 26. In the particular example of this type of mercury tube switch device illustrated in Figs. 1 to 5, there is a tubular housing 44 which may be made of glass and which is generally cylindrical in shape, with a post 45 of insulating material, usually of glass, extending substantially from end to end in the chamber 46 of the housing. This post 45 may, if desired, be formed by a reentrant wall in one end of the housing 44. The conductors 28 and 29 extend through the wall of the housing 44, and within the chamber 46, these conductors are extended as contact terminals A and B respectively, and formed of metal of a kind not wet by mercury, such as pure iron or iron alloys.

These electrodes of contact terminals A and B are wound spirally in spaced relation from one another from end to end on the post, with the conductors alternating in turns for substantially the full length of the chamber 46. This post 45 is disposed eccentrically to the axis of the housing. For example, the axis of the post 45 is shown by the dot and dash lines 47, which is parallel to but offset from the axis 27 of the gear 22. This will provide within the chamber 46 a shorter distance from the periphery of the post to the adjacent side wall of the chamber 46 at one side, than it is at the other side, and this distance will vary progressively between these two zones of the side wall. Disposed in the chamber 46 is a globule or small body 48 of mercury or other conducting liquid having a high surface tension and which does not wet the wall of the chamber 46 nor the metal of the terminals A and B wound upon the post 45.

Mercury, because of its very high surface tension, and the fact that it does not wet glass walls, pure iron and various alloys, is particularly suitable for this purpose. The globule or body 48 of mercury is of such size that it tends to form a somewhat ball-like shape in which a substantial portion of the globule or body will be held away from, and against spreading along, the wall against which it is resting or against which it is confined by centrifugal forces, by its surface tension in opposition to the action of gravity. This globule is also of a size such that when resting upon or confined against a zone of the periphery of the chamber 46 which is farthest from the post 45, it will contact with and connect at least two of the adjacent turns of the terminals A and B wound upon the post 45, as shown in Fig. 1. Thus, this globule of mercury, regardless of its position along the side wall of the chamber 46, will connect two alternate turns of conductor terminals on the post 45. The housing 44, as usual with mercury tube switches, is hermetically sealed, but before sealing, the air of the chamber is exhausted and replaced with an inert gas, so that in use, there will be no corrosion or destruction of the mercury and the conductor terminals within the housing.

Since the housing 44 is offset from or eccentric to the axis of rotation of the shaft 1, it follows that when the shaft is rotated, regardless of the position in which it is placed, the centrifugal forces acting on the globule 48 of mercury will tend to throw this globule against that portion or zone of the side wall of the chamber 46 which is then farthest from the axis of rotation of the shaft 1 and confine it undivided and relatively immovable against that portion or zone of the side wall of the chamber 46. The centrifugal forces acting on the globule will also oppose the forces of the surface tension of the mercury and tend to flatten the globule or body against the side wall of the chamber 46 to an extent which will vary with the centrifugal forces acting thereon. As the speed of rotation of the shaft increases the globule will be flattened to greater and greater extents in opposition to the surface tension of the mercury, until the mercury leaves contact with at least one of the conductor terminals wound upon the post 45, whereupon the circuit through the switch device is opened. If now the speed of rotation of the shaft 1 decreases, the forces of surface tension will overcome the then weaker centrifugal forces and tend to restore the mercury globule to its former shape and recontact the conductor terminals on the post 45 from which it had been separated, so as to reestablish an electric circuit between the conductor terminals through the globule.

If the housing 44 is turned about the axis 27, such as by rotation of the gear 22, this will place the post 45 at different distances from the axis of the shaft 1 and thus place farthest from the extended axis of shaft 1, different portions of the chamber 46 which have different distances from the side wall of the chamber to the post. If, for example, the housing 44 is turned 180° about axis 27 from the position shown in Fig. 1, the zone or portion of the side wall of chamber 46 which is nearest the post 45, will be shifted into a position in which it is farthest from the shaft 1. Then when the shaft 1 is rotated, the mercury globule will be confined against that zone of the side wall of chamber 46 which is nearest the post and, consequently, much greater centrifugal forces will be required in order to flatten the globule of mercury sufficiently to cause its separation from at least one of the contact terminals or electrodes wound on the post 45 and open the circuit. Since the centrifugal forces vary directly in proportion to the speed of the shaft 1, it will be noted that the circuit will be opened only after a much higher speed of the shaft is reached.

Adjustment of the housing 44 in this manner about axis 27 to different extents will, of course, place different zones of the side wall of the chamber 46 farthest from the axis of shaft 1, and thus make the switch device responsive to other intermediate speeds of rotation. Since the housing 44 is clamped by the arm 24, and through it to the gear 22, it follows that by turning the control member 41, the gear 22 may be rotated, and through it the housing 44 may be rotated, about the axis 27, so as to place different zones of the periphery of the chamber 46 farthest from the extended axis of shaft 1. This provides an adjustable regulation of the speed at which the switch device becomes effective, and since the control member 41 is carried by the housing 39, which is on the non-rotary base 3, this control member may be turned in one direction or the other to vary the speed at which the switch device becomes effective, even while the controller is rotating with the shaft 1. Since the ball head 43 of the controller 41 is approximately in endwise alinement with the shaft 1, it follows that there will be little wear between the head and the abutment 38 on the lever 35, due to the relative rotation of the lever with the shaft 1.

Figure 5:
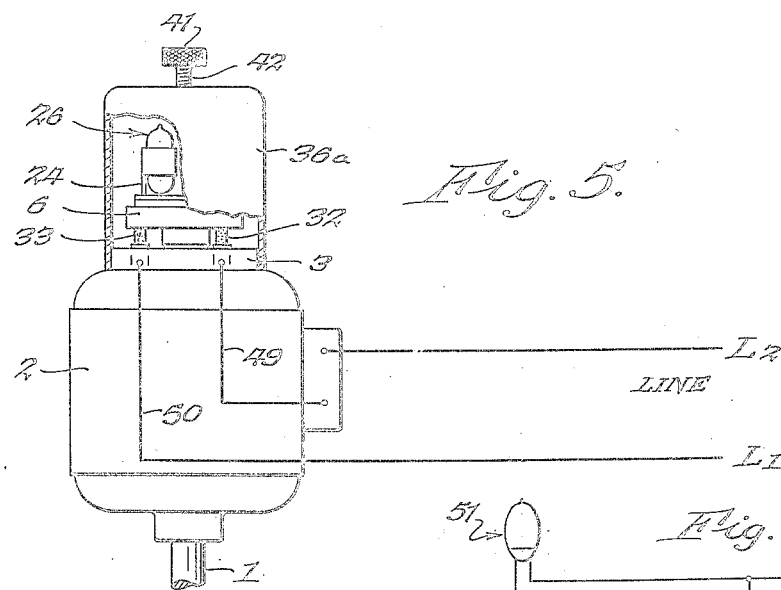
Fig. 5 is a schematic diagram of a motor controlled by a circuit controller that is constructed in accordance with this invention.

Referring now to Fig. 5, which is a schematic diagram showing the use of this type of circuit controller to control the speed of an electric motor 2 having a rotor shaft, the brush 32 is connected by a wire 49 to one terminal of the motor 2, and the other brush 33 is connected by a wire 50 to line wire L'. The other line wire L² is connected directly to the other terminal of the motor. This places the switch device 26 in series with the circuit of the motor, so that when power is applied to the line wires L' and L², the motor will be started because the globule of mercury in the switch device normally closes a circuit through the motor. As the motor operates its armature shaft 1 will rotate the switch device 26 bodily about the axis of the shaft 1, and the centrifugal forces acting on the globule therein will tend to flatten it in opposition to its surface tension, and when a predetermined speed of the motor has been reached, the globule will open the circuit of the switch device and interrupt the application of power to the motor. The speed of the motor then falls, whereupon the globule will reestablish the circuit through the motor and the motor will again tend to build up to its former speed. Thus, the switch device 26 effectively prevents the speed of the motor from exceeding a predetermined speed. In addition, to this bodily rotation of the switch device 26 about the axis of the shaft 1, it may also be additionally rotated about its own axis 27, even while the motor is running, merely by turning the control element 41 in one direction or the other, depending upon whether an increase or decrease in the maximum speed is desired. The switch device 26 may, if desired, control the motor circuit through a relay instead of being included in series in the motor circuit.

Figure 7:
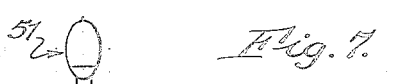
Fig. 7 is a schematic diagram showing how the normally open switch device such as shown in Fig. 5 may be used to control the speed of a motor.
Figure 6:
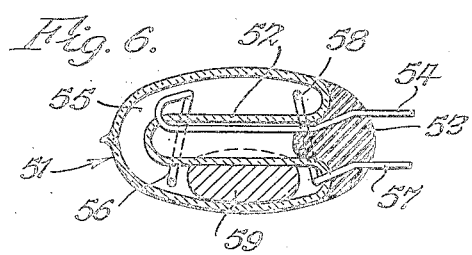
Fig. 6 is a sectional elevation of another type of mercury tube switch that may be employed.

In the example of a mercury tube switch shown in Figs. 6 and 7, the circuit is normally open, but closed by centrifugal forces. In this embodiment, the housing 51 is of glass and generally elliptical with a reentrant end wall forming a hollow post 52 which may be either eccentric or concentric to the housing and is filled at its outer end by a plug 53 of insulating material. One conductor 54 passes along the interior of the post 52 to its inner end, thence into the chamber 55 where it terminates in an exposed loop 56 disposed in a plane oblique to the longitudinal axis of the post. Another conductor 57 extends into the chamber 55 adjacent the base of the post 52, where it terminates in a disposed loop 58, also exposed in a plane oblique to the longitudinal axis of the post, but convergent to the plane of the other loop. A globule 59 of mercury, similar to globule 48 of Figs. 1 to 4, is within chamber 55 and when resting on the side wall of the chamber it will not contact with both loops. When the globule is flattened by centrifugal forces, it becomes longer, and when flattened sufficiently, it engages and electrically connects both loops. When the globule is on the side of the chamber 55, where the distance from the globule to one or both loops is greatest, larger centrifugal forces will not be required to lengthen the globule sufficiently to cause it to electrically connect both loops than when the globule is at the opposite side of the chamber. By turning this housing 51 with the gear 22 in place of switch housing 44, as the switch device 26, different wall zones of the chamber 55 may be placed farthest from the axis of shaft 1, so that different speeds will be required to cause the globule to electrically connect the loops. The air of the chamber 55 will, of course, be replaced with an inert gas and the chamber sealed.

In Fig. 7, such a switch is shown as connected in series with the winding 60 of a relay and the line wires L' and L², and the armature 61 of the relay is normally urged into closed position by spring 62 but moved to open circuit position by energization of the winding 60. The armature 61 is connected in series in the motor circuit, as shown, so that the motor circuit will be opened through the relay when the motor speed reaches a selected maximum at which the globule 59 electrically connects the loops 56 and 58. This speed can, of course, be varied by rotation of the housing 51 with the gear 22 as for housing 44.

It will also be understood that while such a circuit controller is particularly useful for controlling the speed of an electric motor, it may also be used, when driven by any shaft 1, to control a circuit to operate a signal or perform any other useful function, and for that purpose, the circuit may be made or broken, depending upon the type of switch device which is selected, in accordance with whether one desires to have a circuit closed or opened at a particular speed.

While I have specifically referred to mercury as the liquid of which the globule 48 is formed, it will be understood that other conducting liquids may be employed if desired, and broadly may be the equivalent of mercury, but when there is a change in the conducting liquid, it may be necessary to change the material of which the housing, the post and the conductor terminals within the chamber are formed, because the liquid of the globule should not wet the surfaces of those parts, otherwise the surface tension will not cause the liquid to assume a somewhat ball-like form, due to the surface tension. Mercury, because of its high surface tension and relatively low expense, is very suitable for this purpose, and for that reason is the preferred conducting liquid.

It will be understood that various changes in the details, materials and arrangements of parts, which have been hereindescribed and illustrated in order to explain the nature of the invention may be made by those skilled in the art within the principle and scope of the invention as expressed in the appended claims.

I claim as my invention:

1. An adjustable circuit controller comprising a rotatable shaft, an element mounted on said shaft for rotation therewith, a mercury tube switch mounted on said element for bodily rotation therewith about an axis coincident with the axis of rotation of said shaft, and for additional rotation about its own axis parallel to and offset from said shaft axis, a control member disposed in axial alignment with said shaft and mounted for movement back and forth in a direction along said shaft axis extended, and means carried by said element for bodily rotation therewith, having an abutment engageable with said member, and operable on said element through endwise movement of said member and its pressure on said abutment, said means being drivingly connected to said switch to rotate the latter about its said own axis when operated by said member, whereby endwise movement of said member will cause rotary movement of said switch about its said own axis independently of its bodily rotation with said element, said switch being responsive to centrifugal forces, due to its rotation with said element, for opening or closing an electric circuit therethrough at a selected speed of its said bodily rotation and being responsive to different speeds at which it opens or closes said circuit depending upon its rotary position about its said own axis.

2. An adjustable circuit controller comprising a rotatable shaft, an element mounted on said shaft for rotation therewith, a gear mounted on said element for bodily rotation therewith and also for individual rotation about an axis parallel to but offset from the axis of said shaft, a control member disposed in approximate, axial alignment with said shaft and mounted for movement back and forth in a direction along said shaft axis extended, driving means operated by endwise movement of said member and in turn driving said gear, a mercury tube switch mounted on said gear for rotation therewith about the gear axis and also bodily with the gear about the shaft axis, said switch being responsive to centrifugal forces, due to its rotation with said element, for opening and closing an electric circuit therethrough at a selected speed of its said bodily rotation, and being adjustable by its rotation about said gear axis to open or close said circuit therethrough at different speeds, depending upon its rotary position with said gear about said gear axis.

3. An adjustable circuit controller comprising a rotatable shaft, an element mounted on and rotatable with said shaft, a support mounted on said element for bodily rotation therewith about the axis of rotation of said shaft and also individually rockable on said element about an auxiliary axis, a control member disposed in approximate axial alignment with said shaft and mounted for movement in a direction along said shaft axis extended, means mounted on said element and operated by said member during endwise movement of the latter, and in turn having a driving connection to said support to rock the latter proportionally to the endwise movement of said member, a circuit breaker mounted on said support for individual rocking therewith about said auxiliary axis and also for bodily rotation therewith about said shaft axis, said breaker being responsive to centrifugal forces created by its bodily rotation with said element to open or close an electric circuit therethrough at a selected speed of its said bodily rotation, and adjustable by its rocking movement with said support to open or close said circuit at different speeds depending upon its rocked position with said support.

4. An adjustable circuit controller comprising a rotatable shaft, an element mounted on and rotatable with said shaft, a support mounted on said element for bodily rotation therewith about the axis of rotation of said shaft and also individually rockable on said element about an auxiliary axis parallel to, and offset from said shaft axis, a control member disposed in approximate axial alignment with said shaft and mounted for movement in a direction along said shaft axis extended, means mounted on said element and operated by said member during endwise movement of the latter, and in turn having a driving connection to said support to rock the latter proportionally to the endwise movement of said member, a housing mounted on said support for rotation therewith and having a closed chamber with a side wall not wet by mercury and representing a surface of generation about said auxiliary axis, a globule of mercury within and only partially filling said chamber and of a size such that when resting on said side wall and subject only to gravity, its surface tension opposing gravity will hold a substantial portion of the globule away from and against spreading along said side wall, a conductor within said chamber in spaced relation to said side wall and said auxiliary axis in a position to be engaged by and separated from said globule as the globule is distorted in shape by changes in centrifugal forces confining said globule against said side wall and changing its shape in opposition to the surface tension of the globule while said shaft is rotating, and means for including said globule and conductor in series with each other in part of an electric circuit to be controlled, said conductor being irregularly spaced relatively to said side wall so as to be just engaged by said globule under different degrees of distortion of the globule by centrifugal forces and surface tension in different peripheral zones of said side wall, whereby rocking of said housing about said auxiliary axis will place different peripheral zones of said side wall farthest from the axis of said shaft and thus vary the degree of distortion of the globule by centrifugal forces necessary to close or open said circuit through it and said conductor.

5. A circuit controller comprising a hollow housing having a closed chamber with a wall not wet by mercury, a small body of mercury within and only partially filling said chamber and of a size to assume a curved form in which a substantial portion thereof is held above and against spreading along, said wall solely by its surface tension opposing the action of gravity thereon, a conductor extending into said chamber from the exterior of said housing and within said chamber having an exposed contact area disposed to be engaged by said mercury body or separated therefrom by changes in shape of said body under the opposing forces of said surface tension and the centrifugal forces acting upon said body when said housing is rotated about an axis eccentric thereto, said contact area having portions thereof disposed at different relative distances from the center of said mercury body while the latter is confined against different peripheral zones of said wall by centrifugal forces of said rotation, whereby by confining the mercury body, undivided and relatively immovable, against different zones of said chamber around the periphery thereof, the centrifugal forces necessary to cause engagement or disengagement between said mercury body and contact area may be varied, means for connecting said mercury body and conductor in series with each other in part of a circuit to be controlled by the engagement or separation of said body and contact area, a support mounting said housing in a position with its axis generally parallel to said wall, said support being mounted for rotation about its own axis which is offset from but parallel to said housing axis, a rotatable element mounting said support for bodily rotation of said housing about an axis eccentric to said housing axis, a control member disposed for movement parallel to said axis of rotation of said element, and means rotating with said element and operable by said movement of said control member for causing rotation of said support about its said own axis to vary the speed at which said part of a circuit will be made or broken by said globule.

6. A circuit controller comprising a rotatable element, a support mounted on said element to rotate therewith and also additionally rotatable on an axis parallel to and offset from the axis of rotation of said element, a switch device mounted on said support and operable by centrifugal forces created by rotation of said element to control part of an electric circuit therethrough, and varying in its response to said centrifugal forces by its rotary position about said parallel rotation axis, a control member disposed for movement parallel to the axis of rotation of said element, and means controlled by said movement of said control member, and rotating with said element, for rotating said support on its said axis to vary the speed at which said device becomes effective.

7. A circuit controller comprising a rotatable element, a control member mounted to move in a direction parallel to the axis of rotation of said element, a lever pivoted on said element and having operative contact with said control member by which said movement of said control member will cause rocking of said lever, a support pivoted on said element for bodily rotation therewith and additionally rotatable about an auxiliary axis at one side of and parallel to said first axis, means also mounted on said element for translating increments of rocking movements of said lever into increments of rotary movement of said support about said auxiliary axis, and a switch device carried by said support, responsive to centrifugal forces created by its rotation with said element for controlling part of an electric circuit in which it may be included, and variable in its control of said circuit by its position about said auxiliary axis.

8. A circuit controller comprising a rotatable element, a support carried by and rotating with said element, a gear mounted on said support for bodily rotation therewith and for rotation about its own axis parallel to and offset from the axis of rotation of said element, a switch device mounted on said gear, a stud carried by said support at one side of and parallel to said axis of rotation of said element, a lever pivoted on said stud and having an abutment approximately aligned with said element axis and rack teeth on another part thereof, a gear mounted to rotate about said stud, meshing with said first gear and also with said rack teeth on said lever, means cooperating with said abutment for rocking said lever in either direction selectively and in all positions of said element during rotation of the element, and means for connecting said switch device continuously to relatively stationary terminals.

9. A circuit controller comprising a rotatable element, a support carried by and rotating with said element, a gear mounted on said support for bodily rotation therewith and for rotation about its own axis parallel to and offset from the axis of rotation of said element, a switch device mounted on said gear, a stud carried by said support at one side of and parallel to said axis of rotation of said element, a lever pivotally mounted on a side of said stud and having an abutment approximately aligned with said element axis and rack teeth on another part thereof, a gear mounted to rotate about said stud, meshing with said first gear and also with said rack teeth on said lever, a relatively stationary base, a control member threaded to said base in approximate endwise alignment with the axis of rotation of said element and having a convex end bearing on said abutment, a spring connected between said lever and said element and urging said abutment against said convex end, whereby turning of said control member in cooperation with said spring will partially rotate said switch device with said first gear in either direction depending upon the direction of turning of said control member, and means by which said switch device may be connected continuously to relatively stationary terminals.

10. A circuit controller comprising a rotatable element, a support carried by and rotating with said element, a gear mounted on said support for bodily rotation therewith and for additional rotation about its own axis parallel to and offset from the axis of rotation of said element, a spring clamp having a socket between its arms, a mercury tube switch removably clamped in said socket between said arms, a stud carried by said element and extending parallel to said axis of rotation of said element, a gear rotatable about said stud and meshing with said first gear, a lever pivoted on a side of said stud, having gear teeth meshing with and driving said gear on said stud, and having an abutment offset from the lever pivot and in a plane normal to the rotation axis of said element, a control member disposed to engage against said abutment, means mounting said control member for movement in a direction parallel to said rotation axis toward and from said abutment, and a spring connected between said support and said lever and urging said abutment against said control member, whereby movement of said control member in said direction will cause rotary movement of said switch about said first gear axis.

11. A circuit controller comprising a rotatable element, a support carried by and rotating with said element, a gear mounted on said support for bodily rotation therewith and for additional rotation about its own axis parallel to and offset from the axis of rotation of said element, a spring clamp having a socket between its arms, a mercury tube switch removably clamped in said socket between said arms, a stud carried by said element and extending parallel to said axis of rotation of said element, a gear rotatable about said stud and meshing with said first gear, a lever pivoted on a side of said stud, having gear teeth meshing with and driving said gear on said stud, and having an abutment offset from the lever pivot and in a plane normal to the rotation axis of said element, a control member disposed to engage against said abutment, means mounting said control member for movement in a direction parallel to said rotation axis toward and from said abutment, a spring connected between said support and said lever and urging said abutment against said control member, whereby movement of said control member in said direction will cause rotary movement of said switch about said first gear axis, collector rings carried by said element and concentric with the axis of rotation of said element, and means including flexible conductors connecting said switch to said rings.

12. A circuit controller comprising a rotatable element, a switch device mounted on said element for bodily rotation therewith and additionally rotatable about an axis parallel to but offset from the axis of rotation of said element, said switch device being operable by centrifugal forces created by bodily rotation of said switch device with said element to control part of an electric circuit therethrough and varying in its response to said centrifugal forces by its rotary position about said offset axis, and means including a control member relatively stationary with respect to said rotation of said element for causing rotation of said switch device about said offset axis while said element is either idle or in motion.

13. A circuit controller comprising a rotatable element, a switch device, means mounting said switch device on said element for bodily rotation therewith and also individually adjustable thereton through increments of rotation about an axis parallel to but offset from the axis of rotation of said element, a control member relatively stationary with respect to the rotation of said element but shiftable to a limited extent relatively to said element in all rotary positions of said element, means carried by said element and controlled by said control member for translating said movements of said control member into rotary increments of rotation of said switch device about said offset axis, said switch device being responsive to centrifugal forces created by the bodily rotation of said switch for controlling part of an electric circuit in which it may be included and variable in its control of said circuit for any speed of bodily rotation by its rotary position about said offset axis.

14. A circuit controller comprising a closed housing having a chamber with a conductor eccentric to the axis of said chamber, a globule of mercury within and only partially filling said chamber but normally engaging with said conductor when confined against the wall of said chamber by centrifugal forces created by rotation of said housing bodily about an axis parallel to but offset from said chamber axis, and separable from said conductor when centrifugal forces flatten said confined mercury to a substantial extent, a support in which said housing is mounted for rotation about said chamber axis, an element mounted for rotation and mounting said support for bodily rotation therewith and also rotation about an axis parallel to and offset from the axis of rotation of said element, a member selectively movable endwise relatively to said axis of rotation of said element, motion translating parts carried by said element, operated by said member and in turn rotating said support relatively to said element, irrespective of whether or not said element is rotating, and circuit connections to said mercury and said conductor that are connected when said mercury engages said conductor and are disconnected when the mercury separates from said conductor.

HARRY L. LAMBERT.